United States Patent Office 3,032,509
Patented May 1, 1962

3,032,509
PARTIALLY-REDUCED COCRYSTALLIZED TRANSITION METAL HALIDE POLYMERIZATION CATALYST

Arthur W. Langer, Jr., Watchung, and Erik Tornqvist, Westfield, N.J., assignors to Esso Research and Engineering Company, a corporation of Delaware
No Drawing. Filed Feb. 3, 1958, Ser. No. 712,697
5 Claims. (Cl. 252—429)

This invention relates to catalyst compositions useful for the low pressure polymerization of alpha olefins. More particularly, the invention relates to the reduction of a vaporized transition metal halide in an atmosphere of a vaporized metal halide, the metal component of which is chosen from group II or III of the periodic table to form a highly active finely divided catalyst and to the polymerization of alpha olefins therewith.

The reduction of titanium tetrachloride to titanium trichloride in the vapor phase at a temperature of at least 600° C. is known to the art. After the titanium trichloride solids are formed in this process, they are collected in an inert liquid.

It has now been found that superior catalysts can be obtained by the reduction of vaporized transition metal halides in which the transition metal is fully oxidized, e.g. titanium tetrachloride, to a partially reduced transition metal compound, e.g. titanium trichloride, at elevated temperatures in an atmosphere containing a vaporized metal compound, the metal component of which is selected from groups II and III of the periodic table, e.g. aluminum trichloride. The reaction products are then cooled, and mixed in an inert solvent to form a finely divided catalyst which has very good activity for the polymerization of alpha olefins when activated with organo-metallic compounds.

The fully oxidized transition metal halides which can be reduced by the process of this invention are those heavy transition metal halides of groups IVB, VB, VI and VIII, for example titanium, zirconium, hafnium, thorium, uranium, vanadium, niobium, tantalum, chromium, molybdenum and tungsten. $TiCl_4$ is particularly preferred herein.

The volatile metal halides, the metal component of which is selected from groups II and III of the periodic table which are useful in the present invention include those group II and III metal halides that exist in vapor form at the elevated reaction temperatures used herein; for example, aluminum chloride, aluminum bromide, zinc halide, boron halides and the like with aluminum chloride being preferred.

The reaction temperature used for the reduction of the vaporized transition metal halide is in the range of 500 to 1200° C., preferably 800 to 1000° C. The reduction can be carried out by heating mixed vapors of the transition metal halide and the group II or III metal halide at this temperature. Alternatively, the reduction can be carried out in an atmosphere which includes hydrogen vapors. The reduction can also be carried out by contacting the vaporized mixture of a transition metal halide, a group II or III metal halide, and hydrogen with a metal reduction catalyst such as platinum, iridium, tungsten, and mixtures thereof to accelerate the reduction. When the reduction is carried out in the absence of hydrogen vapors, free halogens are formed during the reaction. When the reduction is carried out in the presence of hydrogen vapors, hydrogen halides are formed during the reaction. In general, from 0.05 to 1.0, preferably 0.1 to 0.5 mols of a group II or III metal halide per mol of transition metal halide is used. When hydrogen is added to this mixture of vapors, it is generally added in a quantity sufficient to at least convert all of the free halogen formed by the reaction to hydrogen halide. It is important that this reduction be conducted in the substantially complete absence of polar compounds such as oxygen, water, and the like.

The mixture of the partially reduced transition metal halide formed by the reaction and the group II or III metal halide is then preferably collected in an inert diluent such as for example titanium tetrachloride, aliphatic hydrocarbons such as heptane, octane and the like, aromatic hydrocarbons such as benzene, xylene, chlorobenzene and the like, and ethers such as dibutyl ether, dioxane and the like, or mixtures of any of the above. The inert diluent can be introduced into a relatively cool portion of the reduction zone in liquid form and the reaction products can be quenched therein. Alternatively, the diluent can be introduced in vapor form and permitted to condense therein by cooling to form the desired liquid diluent for collecting the metal halides. A suspension of partially reduced transition metal halide cocrystallized with the group II or III metal halide is formed by this process in the inert diluent, and this slurry can be utilized directly to polymerize alpha olefins by activating the suspended cocrystallized metal halides with an organo-metallic compound. However, since the slurry normally will contain some unreduced transition metal halide, it is preferable to first separate the solid suspension and the liquid component of the suspension by any suitable means such as centrifugation, filtration, evaporation and the like in an inert atmosphere to isolate the cocrystallized metal halides. The isolated metal halides are then preferably ball-milled and thereafter suspended in an organic diluent substantially completely free from oxygen or other active polar compounds. The organic diluent can be an aliphatic hydrocarbon such as hexane, heptane, octane, cyclohexane and the like, an aromatic hydrocarbon such as benzene, xylenes, dichlorobenzene, or an ether such as dibutyl ethers and dioxane or mixtures of any of the above solvents.

The suspended cocrystallized metal halides are then activated by the addition thereto of organo-metallic compounds having reducing properties, preferably organo-aluminum compounds and especially aluminum alkyl compounds such as alkyl aluminum halides and trialkyl aluminum, e.g. triethyl aluminum. Other organo-metallic compounds that can be used are dialkyl zinc, dialkyl magnesium, triaryl aluminum, and complexes such as lithium aluminum tetraalkyl. In general, from 0.1 to 5.0 mole of the organo-metallic compound per mole of partially reduced transition metal halide present in the cocrystallized halides is added to form an activated catalyst slurry.

These activated catalyst slurries can then be utilized for the polymerization of alpha olefins such as ethylene, propylene, butene-1, heptene-1 and the like or for the copolymerization of a mixture of two or more of such olefins. The polymerization temperatures and pressures are not critical but in general the pressures will be from about 0 to 500 p.s.i.g. and the temperature will range from about 0° to 150° C. The catalysts of the present invention are particularly useful for the polymerization of propylene, and the conditions utilized therefore are preferably temperatures in the range of 50° to 100° C. and pressures in the range of 1 to 10 atmospheres. The procedures used for the low pressure polymerization of alpha olefins and mixtures thereof with catalyst systems made up of partially reduced heavy transition metal compounds and a reducing organo-metallic compound are well known to the art; see e.g. Belgium Patent 533,362 "Chemical and Engineering News," April 8, 1957, pages 12 through 16, and "Petroleum Refiner," December 1956, pages 191 through 196.

The polymerization reaction is carried out by contacting an alpha olefin with the catalyst slurry either continuously by introducing the olefin with the catalyst slurry or in batch polymerization by adding a pre-determined amount of gaseous or liquefied olefin to the catalyst slurry in a pressure vessel. In general, the polymer slurry should contain from about 5 to 30 wt. percent solids and therefore the diluent is employed in amounts sufficient to provide a slurry of this concentration.

The present invention will be better understood by reference to the following examples.

EXAMPLE I 90 g. of $TiCl_4$ and 10 g. of $AlCl_3$ were vaporized together, mixed with hydrogen, and brought into contact with a platinum wire heated to about 700° C. for about 100 minutes. Reduction of $TiCl_4$ to $TiCl_3$ occurred at the surface of the hot platinum wire and the $TiCl_3$—$AlCl_3$ product was collected in the excess liquid $TiCl_4$. The $TiCl_3$—$AlCl_3$ was then filtered under a blanket of pure $N_2$, washed with pure, dry n-heptane and finally vacuum dried. Thereafter, the co-crystallized $TiCl_3$-$AlCl_3$ catalyst was mixed with xylene to form a xylene slurry of 1 g. of $TiCl_3$—$AlCl_3$ per liter of xylene. Aluminum triethyl was added to the xylene slurry in an amount sufficient to form an $AlEt_3/TiCl_3$ ratio of 2.3. Additional xylene was then added to obtain a catalyst concentration of 3.0 g. catalyst/liter xylene. Next propylene gas was passed into the xylene slurry at atmospheric pressure and at a temperature of 165° F. The rate of polymerization and the molecular weight of the polypropylene obtained are given in Table I.

EXAMPLE II

This catalyst was prepared according to the process of Example I except that no $AlCl_3$ was used. The rate of polymerization of propylene and the molecular weight of polypropylene obtained with this $AlEt_3$ activated catalyst are also given in Table I for comparison purposes.

*Table I*

|  | Ex. I | Ex. II |
| --- | --- | --- |
| Rx. rate, g./hr./g | 5 | 1 |
| M.W. $\times 10^{-3}$ | 146 | 215 |

It can be seen from Table I that surprisingly a five-fold increase in polymerization reaction rate was obtained with the catalyst of Example I, which is the activated cocrystallized $TiCl_3$—$AlCl_3$ catalyst, compared to that of Example II, which was the activated $TiCl_3$ catalyst prepared in the absence of $AlCl_3$.

Additionally, ball milling of the above catalyst will substantially increase catalyst activity so that the reaction rate given for the catalyst of Example I is a minimal value only.

It is to be noted that the invention is not limited by the examples which are given for illustration purposes only. Also, modifications of the invention can be made without departing from the spirit and scope of the invention.

What is claimed is:

1. A method for producing an improved transition metal halide catalyst component useful when activated with an organometallic compound for the low pressure polymerization of alpha olefins comprising heating a mixture of vapors of titanium tetrachloride, hydrogen vapors and from 0.05–1.0 mol of aluminum trichloride/mol titanium chloride at a temperature in the range of 500° to 1,000° C. to effect partial reduction of said transition metal halide and isolating a finely divided catalyst component consisting essentially of partially reduced transition metal halide cocrystallized with the second metal halide.

2. The process of claim 1 wherein the temperature is in the range of 800° to 1000° C.

3. The process of claim 1 wherein the mixture of volatile partially reduced titanium chloride and the volatile aluminum trichloride is collected in an inert diluent selected from the group consisting of titanium tetrachloride, aliphatic hydrocarbons, aromatic hydrocarbons, ethers, and mixtures thereof.

4. The process of claim 1 wherein the finely divided catalyst component formed by the process is then activated by the addition thereto of an aluminum alkyl compound having reducing properties.

5. A method for producing an improved transition metal halide catalyst component useful when activated with an organometallic compound for the low pressure polymerization of alpha olefins comprising heating a mixture of vapors of titanium tetrachloride and from 0.05–1.0 mol of aluminum trichloride/mol titanium chloride in contact with hydrogen vapors and with a metal reduction catalyst selected from the group consisting of platinum, iridium, tungsten and mixtures thereof at a temperature in the range of 500 to 1000° C. to effect partial reduction of said titanium chloride and isolating a finely divided catalyst component consisting essentially of partially reduced titanium chloride cocrystallized with the aluminum trichloride.

References Cited in the file of this patent

UNITED STATES PATENTS

| 2,770,541 | Singleton | Nov. 13, 1956 |
| 2,822,357 | Brebner et al. | Feb. 4, 1958 |
| 2,893,984 | Seelbach et al. | July 7, 1959 |

FOREIGN PATENTS

| 874,215 | Germany | Apr. 20, 1953 |
| 511,807 | Canada | Apr. 12, 1955 |
| 1,132,506 | France | Mar. 12, 1957 |
| 785,314 | Great Britain | Oct. 23, 1957 |

OTHER REFERENCES

Journ. of App. Chem., vol. 7, page 192, February 1957.